United States Patent [19] [11] 4,097,646
Kitahara et al. [45] Jun. 27, 1978

[54] ELECTROSTATIC RECORDING MATERIAL HAVING A DIELECTRIC COPOLYMER COATED LAYER

[75] Inventors: Makoto Kitahara; Shozo Ishikawa; Kazuharu Katagiri; Tetsuo Arita; Shoji Masubuchi, all of Tokyo, Japan

[73] Assignee: Copyer Co., Ltd., Tokyo, Japan

[21] Appl. No.: 605,380

[22] Filed: Aug. 18, 1975

[30] Foreign Application Priority Data

Aug. 22, 1974 Japan ................................ 49-96374
Oct. 11, 1974 Japan ................................ 49-116114

[51] Int. Cl.[2] ................................ B32B 5/16
[52] U.S. Cl. ................................ 428/323; 428/331; 428/403; 428/412; 428/413; 428/522; 428/447; 428/451; 428/452; 428/454; 428/463; 428/483; 428/514; 428/516; 428/517; 428/518; 428/519; 427/74; 427/391; 162/138; 260/851
[58] Field of Search ................ 428/514, 516, 517, 518, 428/519, 522, 331, 538, 323, 412, 483, 463, 532, 413, 454, 451, 452; 427/74, 391; 162/138; 260/851

[56] References Cited

U.S. PATENT DOCUMENTS

| | | | |
|---|---|---|---|
| 2,892,804 | 6/1959 | Crissey | 428/454 X |
| 3,264,137 | 8/1966 | Gess | 428/514 |
| 3,404,116 | 10/1968 | Pueschner et al. | 428/514 X |
| 3,459,593 | 8/1969 | Cole | 428/514 X |
| 3,841,903 | 10/1974 | Huang et al. | 428/483 X |
| 3,849,188 | 11/1974 | Suzuki et al. | 428/412 |
| 3,916,065 | 10/1975 | Moriconi et al. | 428/407 X |
| 3,991,253 | 11/1976 | Markhart et al. | 428/463 X |

*Primary Examiner*—P. C. Ives
*Attorney, Agent, or Firm*—Sughrue, Rothwell, Mion, Zinn and Macpeak

[57] ABSTRACT

An electrostatic recording material, such as a dielectric coated paper and a paper for transfer of an electrostatic image, having a dielectric layer comprising a copolymer which comprises about 15 to 70 mol% of methacrylic acid and about 85 to 30 mol% of a methacrylate or acrylate and which contains free carboxylic acid groups, and a process for producing the electrostatic recording material comprising coating a water-soluble or -emulsifiable ammonium or amine salt of the copolymer on a support and drying the coated support.

10 Claims, No Drawings

ELECTROSTATIC RECORDING MATERIAL HAVING A DIELECTRIC COPOLYMER COATED LAYER

BACKGROUND OF THE INVENTION

1. Field of the Invention

This invention relates to an electrostatic recording material for a facsimile or a high speed electrostatic printer such as a dielectric coated paper or a paper for transfer of an electrostatic image. More particularly, this invention relates to an electrostatic recording material for a recording layer of a dielectric coated paper in which an electrostatic latent image is directly formed on a dielectric recording layer by applying an electric charge thereto, or of a paper for transfer of an electrostatic image in which an electrostatic latent image previously formed on an electrophotographic plate in an electrophotographic process is transferred to the paper.

2. Description of the Prior Art

Conventional recording papers have an electrically conductive layer and a dielectric layer superposed on the conductive layer on one surface of a base paper and an electrically conductive layer on the other surface of the base paper. Materials used as the dielectric layer are highly insulating resins, e.g., organic solvent type resins such as silicone resins, epoxy resins, polyvinylacetal resins, vinyl acetate resins, vinyl chloride resins, and styrene and butadiene copolymers. These resins are generally dissolved in an organic solvent and coated on a base paper.

The dielectric layer must have a high surface inherent electric resistance higher than about $10^{10}\Omega$ even under conditions of high temperatures and high humidities and, therefore, the above-described organic solvent type resins have heretofore been commonly utilized as a dielectric material.

However, the use of the above organic solvent type resins is disadvantageous in that they are dangerous because of their ignitible or explosive properties during the coating thereof and most of the organic solvents used for these organic solvent type resins are toxic to humans. Therefore, the use of these organic solvent type resins requires specific equipment for the safety of the operators and for the recovery of the solvents used in order to prevent environmental pollution.

In addition, it is necessary to provide an under-coat layer as a barrier coating on a base paper prior to the coating of the solution of the organic solvent type resins to prevent penetration of the solvent used in the solution into the paper.

In view of the above, some attempts have been made to use water-soluble or -emulsifiable resins as a dielectric material in order to eliminate the above-described disadvantages associated with the use of the organic solvent type resins.

Generally, these water-soluble or -emulsifiable resins do not penetrate into base papers so that a barrier coating to prevent the dielectric coating material from penetrating into the base paper is not required.

However, there are also some problems in the use of water-soluble or -emulsifiable resins as a dielectric material and, thus, these resins have not yet been practically used for producing dielectric coated materials.

One of the disadvantages of these water-soluble or -emulsifiable resins is that most of the resins are in general more hydrophilic than the organic solvent type resins and, therefore, they are hygroscopic under high humidity conditions. Thus, deterioration of the charging characteristics of the dielectric layer results.

Another problem associated with the use of water-soluble or -emulsifiable resins is that the surface active agents such as emulsifying agents used in preparing a coating liquid of the resin adversely affect the charging characteristics of the layer thereby resulting in the charging characteristics of the resulting dielectric layer being extremely poor.

SUMMARY OF THE INVENTION

An object of this invention is to provide an electrostatic recording material having superior dielectric characteristics, such as a dielectric coated paper and a paper for transfer of an electrostatic image, and a process for preparing electrostatic recording materials which are easily coatable and where problems of toxicity to humans and the danger of fire and explosion during manufacture are eliminated.

The above object can be achieved by using a methacrylic acidtype copolymer as a dielectric layer. More specifically, it is achieved by using a water-soluble or -emulsifiable methacrylic acid-acrylate copolymer or methacrylic acid-methacrylate copolymer as a dielectric layer and coating the copolymer on a support and then drying the coated support.

DETAILED DESCRIPTION OF THE INVENTION

Useful methacrylic acid-methacrylate copolymers for the electrostatic recording materials of this invention are those derived from methacrylic acid and methacrylates containing at least 6 carbon atoms, preferably 6 to 22 carbon atoms. Examples of suitable methacrylates include those formed between methacrylic acid and aliphatic alcohols containing at least 2 carbon atoms, preferably 2 to 18 carbon atoms. Specific examples include ethyl methacrylate, propyl methacrylate, n-butyl methacrylate, tert-butyl methacrylate, iso-butyl methacrylate, n-hexyl methacrylate, octyl methacrylate, 2-ethylhexyl methacrylate, lauryl methacrylate, and stearyl methacrylate. Copolymers derived from methacrylic acid and methacrylates containing an aryl or aralkyl group in which the alkyl moiety thereof has 1 to 12 carbon atoms, such as phenyl methacrylate or benzyl methacrylate, can be employed. A copolymer of methacrylic acid and butyl methacrylate exhibits especially superior properties.

Useful methacrylic acid-acrylate copolymers for the electrostatic recording materials of this invention are those derived from methacrylic acid and acrylates containing at least 7 carbon atoms, preferably 7 to 21 carbon atoms. Examples of suitable acrylates include those formed between acrylic acid and aliphatic alcohols containing at least 4 carbon atoms, preferably 4 to 18 carbon atoms, such as n-butyl acrylate, tert-butyl acrylate, iso-butyl acrylate, n-hexyl acrylate, octyl acrylate, 2-ethylhexyl acrylate, dodecyl acrylate, lauryl acrylate, and stearyl acrylate. Those acrylates in which the alcohol residue contains an aryl or aralkyl group in which the alkyl moiety thereof has 1 to 11 carbon atoms, such as phenyl acrylate or benzyl acrylate, can also be used. Of these acrylates, 2-ethylhexyl acrylate exhibits especially superior properties.

However, of the methacrylic acid copolymers, methyl, ethyl and propyl acrylate copolymers scarcely show any electrostatic properties. Accordingly, when the total number of carbon atoms of the acrylate is less than 6, the object of this invention cannot be achieved.

In the methacrylic acid copolymers, the proportion of the methacrylic acid unit is about 15 to 70 mol%, preferably 20 to 60 mol%, based on the copolymer.

A marked increase in the methacrylic acid unit content in the methacrylic acid copolymer gives rise to a deterioration in the charging characteristics. As a result, in the electrostatic recording process or the transfer of an electrostatic image process, the image-recording characteristics become insufficient. On the contrary, when the methacrylic acid unit content is markedly reduced, an aqueous solution or dispersion of the methacrylic acid copolymer cannot be obtained.

The number average molecular weight of the methacrylic acid copolymer which can be used in this invention generally ranges from about 2,000 to 400,000, preferably 6,000 to 50,000. When the molecular weight of the methacrylic acid copolymer is too low, the film-formability and flexibility of the coated film become insufficient, and when the molecular weight of the copolymer is too high, an aqueous solution or dispersion of the copolymer is difficult to obtain.

In order to convert the methacrylic acid copolymer of this invention into the form of an aqueous solution or self-emulsifiable aqueous dispersion, the carboxyl groups of the methacrylic acid copolymer are neutralized with an aqueous ammonia solution and/or a volatile amine solution to form the methacrylic acid copolymer salt. The amount of the ammonia and/or amine used in the neutralization is necessarily at least about 20 mol% of the methacrylic acid of the methacrylic acid copolymer. As the number of carboxyl groups neutralized increases, the water-solubility or dispersibility increases. If desired, up to about 100 mole% of the carboxyl groups of the methacrylic acid copolymer can be neutralized.

Suitable examples of volatile amines which can be used include ammonia; mono-, di- or trialkylamines in which the alkyl moiety thereof contains 1 to 4 carbon atoms, such as mono-, di- or trimethylamine, mono-, di- or triethylamine, mono-, di- or triisopropylamine, mono-, di- or trin-propylamine, mono-, di- or tri-n-butylamine, mono-, di- or tri-secbutylamine, mono-, di- or tri-tert-butylamine and the like; alkanolamines in which the alkyl moiety thereof contains 1 to 4 carbon atoms, such as mono-, di- or triethanolamine, mono-, di- or tripropanolamine and the like; monoor dialkyl alkanolamines in which the alkyl moiety and the alkanol moiety thereof each contains 1 to 4 carbon atoms, such as mono- or dimethyl ethanolamine, mono- or dimethyl isopropanolamine, mono- or diethyl ethanolamine, mono- or diethyl isopropanolamine and the like. Further, a mixture of two or more of these can be employed.

In a step of coating this aqueous solution or dispersion on a support followed by drying the coated support, the ammonia and/or volatile amines used are volatilized, and the main portion of the methacrylic acid copolymer salt is converted to a copolymer of methacrylic acid and an acrylate or a copolymer of methacrylic acid and a methacrylate.

Accordingly, the ammonia and/or amines used to form the methacrylic acid copolymer salts have the ability to convert the methacrylic acid copolymers to water-soluble or self-emulsifiable aqueous dispersions, and are substantially volatilized off upon drying at a temperature of about 130° C within a period of about 1 minute or less to provide a resin layer having a surface inherent resistivity, at 20° C and an RH of 65%, of at least $10^{10}\Omega$.

Where many of the carboxyl groups of the methacrylic acid copolymer are in the form of the ammonium and/or amine salt thereof due to the insufficient dryness, the electric resistance of the resulting film is insufficiently increased, and hence, the dielectric properties are poor. Therefore, the proportion of the carboxyl groups in the form of the ammonium and/or amine salt is preferably as low as possible. However, up to about 10 mol% of the carboxyl groups in the form of the ammonium and/or amine carboxylates based on the total carboxyl groups can be present in the copolymer from a practical standpoint.

The aqueous solution or dispersion of the methacrylic acid copolymer of this invention does not usually contain a surface active agent or an organic solvent, but if desired, such may contain a surface active agent or a water-miscible organic solvent in amounts that do not impede the performance of the dielectric layer nor degrade the working environment.

The copolymer used in this invention which is soluble or self-emulsifiable in water can be handled without difficulty and can be coated on a support such as a base paper extremely easily and simply to form a dielectric layer thereon. The coating can be effected using any conventional coating technique using an apparatus which is well known to be suitable for forming a resin coating of the thickness as specified herein, such as coating using a trailing blade, an air knife, a gravure roll, a rod and the like. These copolymer resins are free from the hazards described with respect to the conventional organic solvent type resins and expensive equipment to prevent the hazards associated with the use of organic solvent type resins are not required with these copolymer resins. In addition, the coated dielectric layer of these copolymers on a base paper exhibits excellent dielectric characteristics which are not achieved at all when conventional resins for aqueous coating are used.

The present invention has been described predominantly with reference to the dielectric coated materials comprising a base paper as a preferred embodiment of a support, but it is to be understood that various types of supports can also be used instead of paper. Examples of such supports include synthetic resin films such as a polyethylene film, a polyester film, a cellulose triacetate film, a cellulose diacetate film, a polycarbonate film, a polyvinyl chloride film, a polystyrene film, a synthetic paper and the like, woven or non-woven fabrics, metal plates or foil, etc. When materials having a low electroconductivity, for example, synthetic resin films, are used, the support preferably has an electrically conductive layer(s) as hereinafter described in detail.

The term "support" as used herein includes both non-electrically conductive supports, i.e., paper, synthetic resins, etc., and electrically conductive supports such as metal supports or non-electrically conductive supports which have been rendered electrically conductive by appropriate treatment such as impregnation, coating, vacuum deposition, etc., of an electrically conductive material on the support, i.e., to a surface resistance less than about $10^8\Omega$. Conventional dielectric coated papers require a barrier coating for preventing penetration of the organic solvent used between a support (base paper) and a dielectric layer, but such a barrier coating is not necessary in the dielectric coated papers of this invention.

In preparing the dielectric coated papers of this invention, the methacrylic acid copolymer can be coated on a base paper directly and, therefore, the manufacturing operations can be simplified as compared with the manufacture of a conventional dielectric coated paper using organic solvent type resins.

Further, in preparing the dielectric material of this invention the dielectric layer can be directly coated on a support, e.g., a support which is electrically conductive, or on a support having thereon an electrically conductive layer with the electrically conductive layer being present on both sides of the support with the dielectric layer being coated on one of the electrically conductive layers on one side of the support, or with the elctrically conductive layer being present on one surface of the support with the dielectric layer being coated on the electrically conductive layer on one side of the support or on the surface of the support opposite the electrically conductive layer on the support.

The thickness of the dielectric layer of the dielectric coated papers of this invention suitably ranges from about 2 to 20 $\mu$, more preferably about 5 to 12 $\mu$.

Generally, when only a resin is used to form the dielectric layer, the coated surface has gloss peculiar to the resin, and looks different from "natural paper". Thus, the images formed thereon are difficult to see. Furthermore, such a layer has poor writability properties with writing instruments such as pencils, ball-point pens or fountain pens. Hence, it is the common practice to add a finely divided powder of, for example, colloidal silica, clay, titanium oxide, or calcium carbonate, to the dielectric layer in an amount of about 20 to 80% by weight based on the solid component of the dielectric layer thereby to inhibit the gloss and improve the writability properties.

Electrostatic recording papers are charged to form an electrostatic latent image by applying a potential of about 200 to 1000 V to the dielectric layer when electrodes are used for charging. Recording papers desirably used have superior dielectric characteristics. Those recording papers having low dielectric characteristics require a device which generates a higher voltage. When copying papers having superior dielectric characteristics are used for transfer of an electrostatic image, photosensitive materials of low potential can be used. The details of the transfer of electrostatic images are described in R. M. Schaffert, Electrophotography, Section IV, Focal Press Limited, London, (1965).

The dielectric layer used in this invention is not limited to those only of methacrylic acid copolymers. If desired, another polymer, such as an acrylic emulsion, a styrene-butadiene latex or a styrene emulsion, can be mixed in an amount of up to about 40% by weight based on the methacrylic acid-type copolymer with the above methacrylic acid-type copolymer to form recording papers having various desired end uses.

This invention is further illustrated in greater detail by reference to the following Examples but the Examples are not to be construed as limiting the scope of this invention. Unless otherwise indicated, all parts, percents, ratios and the like are by weight.

SYNTHESIS EXAMPLE 1

In a 200 cc three-necked flask equipped with a stirrer and a reflux condenser, 25.63 g (0.20 mole) of butyl acrylate and 6.89 g (0.03 mole) of methacrylic acid were dissolved in 60 ml. of ethanol, and 0.256 g of benzoyl peroxide was added. The mixture was stirred at the reflux temperature under a stream of nitrogen. As the polymerization progressed, the mixture gradually became viscous. In about 4 hours, stirring become impossible, and therefore, the reaction was stopped. The reaction mixture was extracted with about 200 ml. of a mixture of equal volumes of methyl ethyl ketone (MEK) and tetrahydrofuran (THF). The extract was poured into 2.5 liters of n-hexane to form a precipirate. The white precipitate was separated by filtration and dried to form 23 g of a product having a melting point (softening point) of 30° to 35° C.

The amount of methacrylic acid contained in the copolymer was found to be 33.8 mole% when determined by a procedure comprising dissolving 0.3 g of the resulting copolymer in a mixture of 10 ml. of MEK and 20 ml. of ethanol, and titrating the solution with a 0.1 N alcoholic KOH solution using phenolphthalein as an indicator. The viscosity of the copolymer was determined to be 6.7 cps by a procedure comprising dissolving 1 g of the copolymer in 10 ml. of MEK and measuring the viscosity at 25° C. using an E-type viscometer (a product of Tokyo Keiki Co., Ltd.).

Under the same conditions, the copolymers shown in Table 1 were prepared.

Table 1

| Copolymer | Amount of Methacrylic Acid Charged (mole) | Amount of Acrylate Charged (mole) | Methacrylic Acid Content of Copolymer (mol %) | Viscosity (cps) | Softening Point (° C) | Number Average Molecular Weight* |
|---|---|---|---|---|---|---|
| Methacrylic Acid-Methyl Acrylate Copolymer | 0.03 | 0.3 | 7.6 | 5.0 | 25 - 60 | 10,000 |
| Methacrylic Acid-Ethyl Acrylate Copolymer | 0.033 | 0.2 | 15.5 | 5.5 | below 20 | 9,000 |
| Methacrylic Acid-Butyl Acrylate Copolymer | 0.08 | 0.2 | 33.8 | 6.7 | 30 - 35 | 11,000 |
| Methacrylic Acid-2-Ethylhexyl Acrylate Copolymer | 0.11 | 0.2 | 49.7 | 131.7 | 95 - 105 | 25,000 |
| Methacrylic Acid-Dodecyl Acrylate Copolymer | 0.15 | 0.2 | 55.7 | 280 | 110 - 116 | 36,000 |

*The molecular weight was measured using a GPC-IA (trademark, produced by Shimadzu Seisakusho Ltd., Japan).

SYNTHESIS EXAMPLE 2

In a 200 cc three-necked flask equipped with a stirrer and a reflux condenser, 22.83 g (0.20 mole) of ethyl methacrylate and 5.17 g (0.06 mole) of methacrylic acid were dissolved in 60 ml. of ethanol, and 0.228 g of benzoyl peroxide was added. The mixture was stirred at the reflux temperature under a stream of nitrogen. As the polymerization progressed, the mixture gradually became viscous. In about 4 hours, stirring became impossible. Hence, the reaction was stopped, and the reaction mixture was extracted with about 200 ml. of MEK. The extract was poured into 2.5 liters of n-hexane to form a precipitate. The white precipitate was separated by filtration, and dried to produce 21 g of a product having a melting point (softening point) of 203° to 218° C.

The methacrylic acid content of the copolymer was determined to be 28.5 mole% by a procedure comprising dissolving 0.3 g of the copolymer in a mixture of 10 ml. of MEK and 20 ml. of ethanol and titrating the solution with a 0.1 N alcoholic KOH solution using phenolphthalein as an indicator. The viscosity of the copolymer was determined to be 15.2 cps by a procedure comprising dissolving 1 g of the copolymer in 10 ml. of MEK and measuring the viscosity with an E-type viscometer (a product of Tokyo Keiki Co., Ltd.).

Under the same conditions, the copolymers shown in Table 2 were prepared.

Table 2

| Copolymer | Amount of Methacrylic Acid Charged (mole) | Amount of the Methacrylate Charged (mole) | Methacrylic Acid Content of Copolymer (mol %) | Viscosity (cps) | Softening Point (° C) | Number Average Molecular Weight* |
|---|---|---|---|---|---|---|
| Methacrylic Acid-Methyl Methacrylate Copolymer | 0.06 | 0.2 | 23.0 | 8.2 | 210 - 220 | 12,000 |
| Methacrylic Acid-Isopropyl Methacrylate Copolymer | 0.09 | 0.2 | 29.9 | 10.6 | 190 - 200 | 16,000 |
| Methacrylic Acid-Butyl Methacrylate Copolymer | 0.1 | 0.2 | 33.9 | 14.3 | 160 - 170 | 18,000 |
| Methacrylic Acid-2-Ethylhexyl Methacrylate Copolymer | 0.2 | 0.2 | 50.0 | 465.0 | 215 - 220 | 42,000 |

*The molecular weight was measured using a GPC-IA (trademark, produced by Shimadzu Seisakusho Ltd., Japan).

EXAMPLE 1

The back surface of a bond paper with a basis weight of 82 $g/m^2$ was coated with a cationic electrically conducting agent composed mainly of an acrylic resin having a quaternary ammonium salt structure (OKS 3262, a product of Nippon Synthetic Chemical Industry Co., Ltd.) so that the amount of the conductive layer after drying became 3 $g/m^2$. 10 g of the methacrylic acid-2-ethylhexyl acrylate copolymer as shown in Table 1 was dissolved in 70 ml. of a 2% aqueous ammonia solution, and the resulting solution was coated on the surface of the above paper using a wire-wound Mayer rod, and dried at 150° C for 90 seconds. The amount of the dielectric layer so coated was 10.5 $g/m^2$.

The resulting electrostatic recording material was subjected to a corona voltage of +6 KV by a static process using an electrostatic copying paper analyzer (Model sp-428, a product of Kawaguchi Electric Works Ltd.). The recording material exhibited good charging properties with a maximum surface potential ($V_{max}$) of +560 V, a potential after dark decay for 10 seconds ($V_{10}$) of +510 V and a potential retention after dark decay for 10 seconds ($V_{10}/V_{max} \times 100$) of 91%.

The paper was then superposed on a light-sensitive material for electrophotography comprising a photoconductive plate which was prepared by vaporizing pure metallic selenium in 30 μthickness on an aluminium base plate (a so called xerographic plate) and on which an electrostatic latent image had been formed previously by charging to a potential of +1000V by corona discharge and image wise irradiating with light. The paper and the light-sensitive material were then pressed by passing the paper and the light-sensitive material through a pressure roller to transfer the electrostatic image to the dielectric coated paper. Afterwards, the thus treated paper was removed from the light-sensitive material and developed in a developer (trademark; Magnedry Image Powder comprising mainly triiron tetroxide (Magnetite) and a resin, produced by Sumitomo 3M Co., Ltd.), whereby a clear image was obtained on the dielectric coated paper.

Using the other copolymers shown in Table 1, electrostatic recording materials were produced and the charging Characteristics were measured in the same way as described above. The results obtained are shown in Table 3 below.

Table 3

| Copolymer Sample (acrylate component) | Amount of Di-electric Layer Coated ($g/m^2$) | $V_{max}$ (+V) | $V_{10}$ (+V) | $V_{10}/V_{max}$ (%) |
|---|---|---|---|---|
| Methyl Acrylate | 10.5 | 19 | 0 | — |
| Ethyl Acrylate | 9.9 | 3 | 0 | — |
| n-Butyl Acrylate | 9.0 | 145 | 80 | 55 |
| 2-Ethylhexyl Acrylate | 10.5 | 560 | 510 | 91 |
| Dodecyl Acrylate | 9.5 | 500 | 440 | 88 |

Furthermore, the charging properties were measured after allowing the electrostatic recording materials to stand at a temperature of 30° C. and a relative humidity of 80% for 24 hours. The results obtained are shown in Table 4.

Table 4

| Copolymer Sample (acrylate component) | $V'_{max}$ (+V) | $V'_{10}$ (+V) | $V'_k$ (%) | $\Delta V_{max}(=V'_{max} - V_{max})$ (V) |
|---|---|---|---|---|
| n-Butyl Acrylate | 120 | 70 | 58 | −60 |
| 2-Ethylhexyl Acrylate | 430 | 385 | 90 | −90 |
| Dodecyl Acrylate | 420 | 340 | 71 | −80 |

Thus, it can be appreciated that as a result of humidification, a decrease (ΔV) in maximum surface potential is observed, but the potential is maintained at a sufficiently feasible level even under high humidity conditions.

For comparison, the charging characteristics of electrostatic recording materials prepared by forming a dielectric layer using commercially available aqueous resins are shown in Tables 5-1 and 5-2 below.

Table 5-1

Charging Characteristics of Commercially Available Aqueous Resins (conditioned for 24 hours at 20° C. and RH 60%)

| Resin | Charging Characteristics $V_{max}$ (volts) | $V_{10}$ (volts) | $V_{10}/V_{max} \times 100$ (%) | Amount of Dielectric Layer Coated ($g/m^2$) |
|---|---|---|---|---|
| Acrylic Emulsion (PT 850, Teikoku Chemical Industry Co., Ltd.) | +66 | +40 | 61 | 5.1 |
| Ethylene/Vinyl Acetate Emulsion (Polysol EVA.P.62, Showa Highpolymer Co., Ltd.) | +88 | +36 | 41 | 6.6 |
| Acrylamide Resin (A-230, Sumitomo Chemical Co., Ltd.) | +8 | +2 | 25 | 6.8 |
| Vinyl Acetate-type Emulsion (Movinyl 771H, Hoechst Gosei) | +22 | +2 | 9 | 6.2 |

Table 5-2

Charging Characteristics at High Humidity (conditioned for 24 hours at 30° C. and 80% RH)

| Resin | Charging Characteristics $V'_{max}$ (volts) | $V'_{10}$ (volts) | $V'_{10}/V'_{max} \times 100$ (%) | $\Delta V$ (volts) |
|---|---|---|---|---|
| Acrylic Emulsion (PT 850, Teikoku Chemical Industry Co., Ltd.) | +10 | +1 | 10 | −56 |
| Ethylene/Vinyl Acetate Emulsion (Polysol EVA.P.62, Showa Highpolymer Co., Ltd.) | +64 | +16 | 25 | −24 |

EXAMPLE 2

10 g of the methacrylic acid-n-butyl acrylate copolymer as shown in Table 1 was dissolved in 100 ml. of 2% aqueous ammonia, and 10 g of precipitated calcium carbonate (TS 90, a product of Nitto Funka Kogyo Co., Ltd.) was dispersed in the solution using a homogenizer. The resulting dispersion was coated on the same base paper as used in Example 1 so that the amount coated after drying became 10 $g/m^2$, and then dried to form an electrostatic recording paper.

Images formed using the same method as in Example 1 on the resulting paper had good quality. The paper had low gloss, and good writability properties. Using a positive electrode for the back surface, a potential of −700 V was applied to the surface of the electrostatic recording paper at a pressure of 70 $g/cm^2$ for 20 microseconds using a type-shaped electrode (alpha-numeric shape). The resulting electrostatic latent image was developed with a toner (191 toner composed mainly of triiron tetroxide (Magnetite), a tradename produced by Sumitomo 3M), whereupon a clear typed material was obtained.

For comparison, an electrostatic recording paper was prepared in the same way as in Example 1 using the methacrylic acid-methyl acrylate copolymer instead of the methacrylic acid-n-butyl acrylate copolymer. The electrostatic image obtained using this electrostatic recording paper was extremely unsatisfactory as compared with those obtained in Examples 1 and 2.

EXAMPLE 3

The back surface of a bond paper with a basis weight of 82 $g/m^2$ was coated with a cationic electrically conducting agent (OKS 3262, a product of Nippon Synthetic Chemical Industry Co., Ltd.) so that the amount of the resulting conducting layer after drying became 3 $g/m^2$. 10 g of the methacrylic acid-ethyl methacrylate copolymer as shown in Table 2 was dissolved in 70 ml. of 2% aqueous ammonia and the resulting solution was coated on the opposite surface to the electrically conductive layer using a wire-wound Mayer rod, and dried at 150° C. for 90 seconds. The amount of the electric layer coated was 5.8 $g/m^2$.

The resulting electrostatic recording material was subjected to a corona voltage of +6 KV by a static process using an electrostatic copying paper analyzer (Model SP-428, a product of Kawaguchi Electric Works Ltd.). The electrostatic recording material exhibited good charging characteristics with a maximum surface potential ($V_{max}$) of +210 V, a potential after dark decay for 10 seconds ($V_{10}$) of +165 V, and a potential retention after dark decay for 10 seconds ($V_{10}/V_{max} \times 100$) of 78.6%.

The recording material was then superimposed on an electrophotographic light-sensitive material on which an electrostatic latent image had been formed by charging the light-sensitive material to +1000 V with a corona discharge and imagewise irradiating the light-sensitive material with light in the same way as in Example 1, and then electrostatic transfer was performed using a press roller. Then, the latent image was developed with a negatively charged electrophotographic developer solution (Reversal Toner LX19-21A, a product of Philip A. Hunt), whereupon images of good quality were obtained.

Using the other copolymers as shown in Table 2, electrostatic recording materials were prepared in the same way as described above, and their charging characteristics were measured under the same conditions as above. The results obtained are shown in Table 6.

Table 6

| Sample Copolymer (methacrylate component | Amount of Di-electric Layer Coated (g/m²) | $V_{max}$ (+V) | $V_{10}$ (+V) | $V_{10}/V_{max}$ (%) |
|---|---|---|---|---|
| Methyl Methacrylate | 8.5 | 11 | 3 | 3 |
| Isopropyl Methacrylate | 9.0 | 430 | 310 | 73 |
| n-Butyl Methacrylate | 5.7 | 550 | 530 | 96.4 |
| 2-Ethylhexyl Methacrylate | 5.6 | 500 | 385 | 75.5 |

The above electrostatic recording materials were allowed to stand at a temperature of 30° C. and a relative humidity of 80% for 24 hours, and then their charging characteristics were measured. The results obtained are shown in Table 7 below.

Table 7

| Sample Copolymer (methacrylate component) | $V'_{max}$ (+V) | $V'_{10}$ (+V) | $V'_k$ (%) | $\Delta V_{max}(V'_{max}-V_{max})$ (V) |
|---|---|---|---|---|
| Ethyl Methacrylate | 145 | 58 | 40 | −65 |
| Isopropyl Methacrylate | 265 | 140 | 53 | −170 |
| n-Butyl Methacrylate | 500 | 490 | 98 | −50 |
| 2-Ethylhexyl Methacrylate | 380 | 255 | 67.1 | −120 |

The above results demonstrate that as a result of humidification, a decrease (ΔV) in maximum surface potential occurs, but a sufficiently feasible potential can be retained even under high humidity conditions.

EXAMPLE 4

10 g of the methacrylic acid-n-butyl methacrylate copolymer as shown in Table 2 was dissolved in 100 ml. of a 2% aqueous methylamine solution and 10 g of precipitated calcium carbonate (TS 90, a product of Nitto Funka Kogyo Kabushiki Kaisha) was dispersed in the solution using a homogenizer. The resulting dispersion was coated on the same base paper as used in Example 3 so that the amount coated after drying became 10 g/m² thereby to form an electrostatic recording paper.

Images formed by the same method as in Example 3 on the resulting paper had good quality. The paper had low gloss, and good writability properties. Using a positive electrode for the back surface, a potential of −700 V was applied to the surface of the electrostatic recording paper at a pressure of 70 g/cm² for 20 microseconds using a type-shaped electrode. The resulting electrostatic latent image was developed with a toner (191 toner, a product of Sumitomo-3M), whereupon clear typed material was obtained.

While the invention has been described in detail and with reference to specific embodiments thereof, it will be apparent to one skilled in the art that various changes and modifications can be made therein without departing from the spirit and scope thereof.

What is claimed is:

1. An electrostatic recording material comprising a support having on one surface thereof a dielectric layer, which comprises a free carboxylic acid group containing copolymer of (1) about 15 to 70 mol% of methacrylic acid and (2) about 85 to 30 mol% of (a) a methacrylate having at least 6 carbon atoms or (b) an acrylate having at least 7 carbon atoms, said copolymer being water-soluble or water-emulsifiable and up to 10% of said carboxylic acid groups being in the form of an ammonium or amine salt thereof.

2. The electrostatic recording material of claim 1, wherein said amine salt of said copolymer is a salt of a mono-, di- or trialkylamine in which the alkyl moiety thereof has 1 to 4 carbon atoms, a salt of an alkanolamine in which the alkyl moiety thereof has 1 to 4 carbon atoms, a salt of a mono- or dialkyl alkanolamine in which the alkyl moiety and the alkanol moiety thereof each has 1 to 4 carbon atoms, or a mixture thereof.

3. The electrostatic recording material of claim 1, wherein said dielectric layer contains said copolymer and an anti-gloss fine powder.

4. The electrostatic recording material of claim 3, wherein said anti-gloss fine powder is colloidal silica, titanium oxide or calcium carbonate.

5. The electrostatic recording material of claim 3, wherein said anti-gloss fine powder is present in a porportion of about 20 to 80% by weight based on the total weight of the solids content of the dielectric layer.

6. The electrostatic recording material of claim 1, wherein said dielectric layer additionally contains at least one other polymer or copolymer selected from the group consisting of styrene, styrene-butadiene, and acrylic polymers in an amount of up to 40% by weight based on the methacrylic acid copolymer.

7. The electrostatic recording material of claim 7, wherein said other polymer or copolymer is derived from an emulsion or latex thereof.

8. The electrostatic recording material of claim 7 wherein said other polymer or copolymer is an acrylic emulsion, a styrene-butadiene latex or a styrene emulsion.

9. The electrostatic recording material of claim 1, wherein said support has an electroconductive layer on at least one surface of said support.

10. A process for producing an electrostatic recording material comprising coating an aqueous solution of a water-soluble or -emulsifiable ammonium or amine salt of a copolymer comprising (1) about 15 to 70 mol% of methacrylic acid and (2) about 85 to 30 mol% of (a) a methacrylate having at least 6 carbon atoms or (b) an acrylate having at least 7 carbon atoms on a support and drying the coated support.

* * * * *